(12) United States Patent
Fredriksson et al.

(10) Patent No.: US 6,226,989 B1
(45) Date of Patent: May 8, 2001

(54) WAVE ENERGY CONVERTER

(75) Inventors: Gunnar Fredriksson, Bettna; Anders Norén, Djursholm, both of (SE)

(73) Assignee: IPS Interproject Service AB, Bettna (SE)

( * ) Notice: Subject to any disclaimer, the term of this patent is extended or adjusted under 35 U.S.C. 154(b) by 0 days.

(21) Appl. No.: 09/171,961

(22) PCT Filed: Apr. 29, 1997

(86) PCT No.: PCT/SE97/00718

§ 371 Date: Oct. 29, 1998

§ 102(e) Date: Oct. 29, 1998

(87) PCT Pub. No.: WO97/41349

PCT Pub. Date: Nov. 6, 1997

(30) Foreign Application Priority Data

Apr. 29, 1996 (SE) .................................... 9601637

(51) Int. Cl.⁷ ...................................... F03B 13/12
(52) U.S. Cl. ................................ 60/501; 60/502
(58) Field of Search .............................. 60/398, 501, 502

(56) References Cited

U.S. PATENT DOCUMENTS 4,076,463   2/1978   Welczer .
4,277,690 * 7/1981   Noren ................................. 60/501
4,773,221   9/1988   Noren .

FOREIGN PATENT DOCUMENTS 3938 667 A1   5/1991   (DE) .

* cited by examiner

*Primary Examiner*—F. Daniel Lopez
(74) *Attorney, Agent, or Firm*—Larson & Taylor PLC

(57) ABSTRACT

A wave energy converter comprises an acceleration tube (14) attached to a buoyant body (11). An intermediate section of the acceleration tube defines a working cylinder (16), with openings in the acceleration tube above and below the working cylinder allowing unobstructed flow of water between the working cylinder and the body of water in which the acceleration tube is immersed. A working piston reciprocates in the working cylinder. A relief passage at each end of the working cylinder is controlled by the working piston to allow unrestricted flow pass the working piston when the piston moves past a predetermined position at the end of the working cylinder. An energy absorbing device (19, 20) is connected to the working piston. A restoring device (19C, 20C) is provided to apply a return force to the working piston towards the working cylinder, if and when the working piston moves past the predetermined position.

3 Claims, 3 Drawing Sheets

WAVE ENERGY CONVERTER

This invention relates to a wave energy converter.

Wave energy converters of this kind, which are sometimes referred to as point absorbers or heaving-buoy wave energy converters, are known from, for example, U.S. Pat. No. 4,773,221. The operation of this particular converter is based on relative motion between, on the one hand, a buoyant body and a so-called acceleration tube attached to and depending from the buoyant body, and, on the other hand, a reciprocable working piston in the acceleration tube; this relative motion is caused by the waves of the sea in which the converter operates.

In a wave energy converter of this kind, the working piston and other masses coupled to it form an inertial system which has no positive coupling to the buoyant body and the acceleration tube in the vertical direction, that is, in the direction of the axis of the acceleration tube.

Naturally, the working piston itself and the associated piston rod have a certain mass, but the mass which moves with the piston is determined primarily by a column of water which moves with the piston.

The wave energy converter known from U.S. Pat. No. 4,773,221 includes a relief system which limits the stroke of the working piston to a predetermined operating range within the acceleration tube. If during its movement in either direction the working piston moves out of the operating range, e.g. as a consequence of an excessive heaving of the buoy, the relief system limits continued movement away from the operating range. More particularly, the relief system operates by relieving the working piston of the force which causes its movement away from its working range in the acceleration tube, namely by allowing water to pass more or less freely past the working piston. Accordingly, a substantially unrestricted communication is established between the columns of water above and below the working piston and thereby between these columns of water and the water surrounding the acceleration tube.

The limitation of the stroke of the working piston eliminates or reduces the danger of excessive loads being applied to the piston rod resulting from heavy sea.

However, the returning of the working piston into the working cylinder, that is, into the normal operating range, when the direction of movement of the buoyant body and the acceleration tube is reversed, takes place in an uncontrolled manner and may be considerably delayed. As a consequence, the efficiency of the wave energy converter is reduced.

A primary object of the invention is to solve this problem and provide a wave energy converter in which the working piston is rapidly and reliably returned into the working cylinder whenever it is moved out of its normal working range.

As will be explained in more detail below, if in the wave energy converter according to the invention the working piston is driven out of the working cylinder, an impulse directed towards the working cylinder will be applied to the working piston by means of an energy accumulator previously charged by the working piston. The triggering of the impulse may be accomplished by means of a position sensor which actuates the energy accumulator in response to movement of the working piston out of the working cylinder.

The energy accumulator may be a hydraulic or hydropneumatic accumulator which is charged by a pump driven by the working piston. Other types of energy accumulators may also be used, however, such as resilient devices which are tensioned and relaxed in push-pull fashion by the working piston during its reciprocating movements.

The invention will be described in greater detail below with reference to the accompanying drawings in which embodiments of the invention are shown by way of example.

Figure 1:
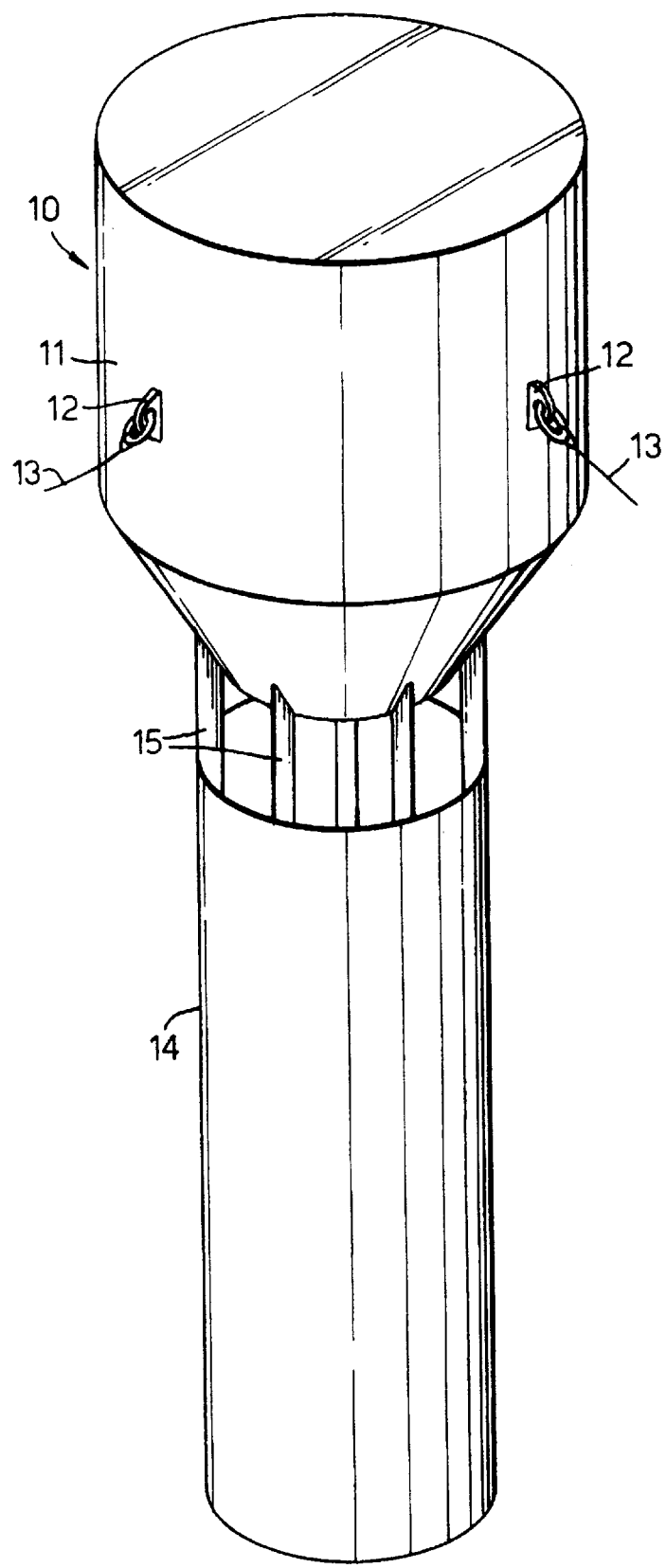
FIG. 1 is a diagrammatic perspective view of a wave energy converter of the kind with which the invention is concerned.

The wave energy converter 10 shown in FIG. 1 embodies the principles of construction and operation described in U.S. Pat. No. 4,773,221. It accordingly comprises a buoyant unit or body 11 provided with attachment lugs 12 for mooring lines 13, and a so-called acceleration tube 14 which depends from the buoyant body 11 and is attached to it by circumferentially spaced longitudinally extending radial webs 15 leaving large openings between them.

As in the wave energy converter of the above-mentioned patent, the acceleration tube 14 is open at both ends so that water can flow freely into and out of it.

Figure 2:
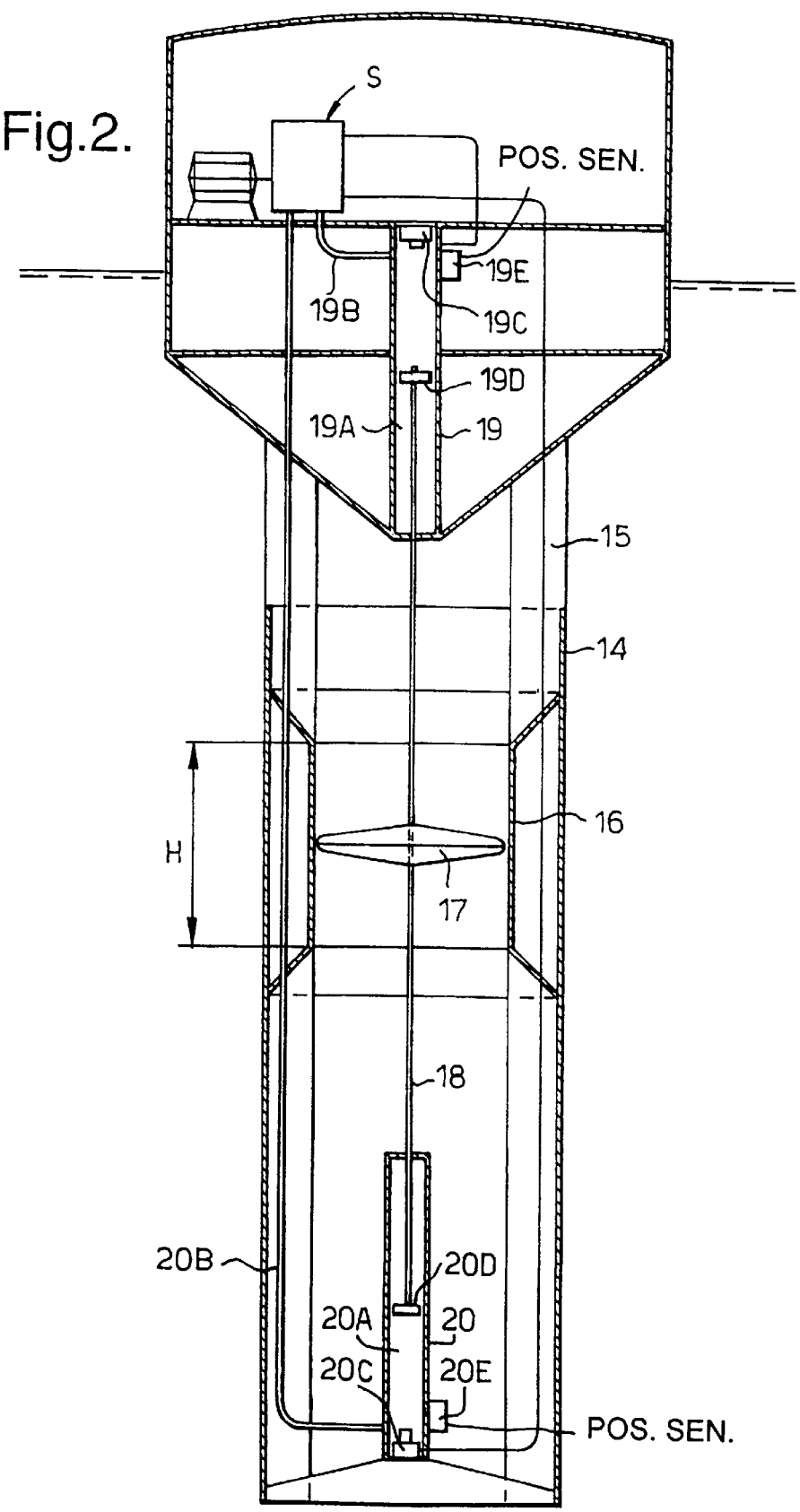
FIG. 2 is a vertical sectional view of the wave energy converter shown in FIG. 1.

As is illustrated in greater detail in FIG. 2, the buoyant body 11 and the acceleration tube 14 accommodate apparatus for converting wave-generated vertical oscillations of the buoyant body 11 and the acceleration tube 14 to electrical energy.

In operation of the wave energy converter 10 the entire acceleration tube 14 and the lower portion of the buoyant body 11 are immersed in water. The mooring lines 13 keep the wave energy converter 10 in a selected offshore position horizontally but permit it to oscillate vertically under the influence of water waves.

Referring to FIG. 2, a section of the acceleration tube 14 intermediate the upper and lower ends thereof defines a working cylinder 16 in which a double-acting working piston 17 is reciprocable in the longitudinal direction of the acceleration tube.

The working piston 17 is secured to a piston rod 18 approximately halfway between the ends thereof. A pair of single-acting hydraulic piston pumps 19, 20 are associated with the ends of the piston rod to operate in push-pull fashion. The upper pump 19 is accommodated in the buoyant body 11 while the lower pump 20 is accommodated in the lower portion of the acceleration tube 14.

As will be described in greater detail below with reference to FIG. 3, the pump chambers 19A, 20A of the pumps 19, 20 are connected to an energy absorbing device (to be described below) through hydraulic fluid lines 19B, 20B.

At the bottom of each pump chamber 19A, 20A, a fluid actuator 19C, 20C is disposed so as to be able to apply a force to the piston 19D, 20D of the associated pump 19, 20 as will be described below.

The length or height H of the working cylinder 16 is chosen such that the working piston 17 will normally reciprocate within the working cylinder. However, there is a possibility for the working piston 17 to move in either direction beyond the end of the working cylinder 16.

To prevent overloading of the piston rod 18 in case the working piston 17 is driven past the end of the working cylinder 16, a relief system is provided at each end of the working cylinder. This relief system operates as described in U.S. Pat. No. 4,773,221 to substantially relieve the working piston 17 from fluid forces when it moves in one direction or the other out of the working cylinder 16 so that further movement of the working piston in the same direction is limited.

To provide for such relief, the working cylinder 16, which is fully open towards the upper and lower sections of the acceleration tube 14, is narrower than the adjoining portions of the acceleration tube. Accordingly, as soon as the working piston 17 moves beyond one end of the working cylinder 16, water can flow more or less freely through a passage formed between the periphery of the working piston and the inner wall of the acceleration tube 14 at the wider portion thereof. In other words, a substantially unrestricted flow path is established between the open upper and lower ends of the acceleration tube 14.

As explained in the introductory portion of this description, the reintroduction of the working piston 17 into the working cylinder may sometimes be considerably delayed so that the wave energy converter may become inoperative for one or more cycles of oscillation.

In accordance with the present invention this problem is solved by means of a restoring device which serves to apply an external force to the working piston to accelerate it towards the working cylinder as soon as the stroke of the working piston has exceeded a certain limit. In the embodiment shown in FIGS. 2 and 3, the fluid actuators 19C, 20C form parts of a hydraulic system S which incorporates the restoring device in addition to the energy absorbind device. operation of the restoring device is triggered by means of position sensors 19E, 20E, such as electromagnetic transmitters, which respond to the proximity of the associated piston 19D, 20D to operate two-position valves 19F, 20F.

The operation of the hydraulic system S is as follows, see FIG. 3.

In normal operation of the wave energy converter 10, that is, when the working piston reciprocates only within the working cylinder 16, pressurized hydraulic fluid is discharged from the pump chambers 19A, 20A of the pumps 19, 20 by way of non-return valves 21 and a solenoid valve 22 (kept open during operation) to a hydraulic main accumulator 23 and a hydraulic motor 24 drivingly connected with an electric generator 25. The hydraulic fluid also charges a pair of hydropneumatic auxiliary accumulators 26, 27 by way of non-return valves 28, 29.

If the stroke of the working piston 17 should become excessive so that the working piston is driven out of the working cylinder 16 and the associated position sensor 19E or 20E responds, the associated two-position valve 19F or 20F will open a flow path for the hydraulic fluid between the associated auxiliary accumulator 26 or 27 and the fluid actuator 19C or 20C of the associated pump 19 or 20. As a result, the working piston 17 will receive from the accumulator and the fluid actuator an impulse which is directed such that it tends to move the working piston 17 back into the working cylinder. When the working piston 17 is thus returned into the working cylinder 16, a return spring restores the valve 19F or 20F to its original or normal position.

Frequent operation of the restoring device, under stormy weather conditions, for example, may cause the auxiliary accumulators 26, 27 to become insufficiently charged. A normally closed two-way solenoid valve 30, 31 may then be opened to supply the impulse and/or recharge the auxiliary accumulators from the main accumulator 23.

Figure 3:
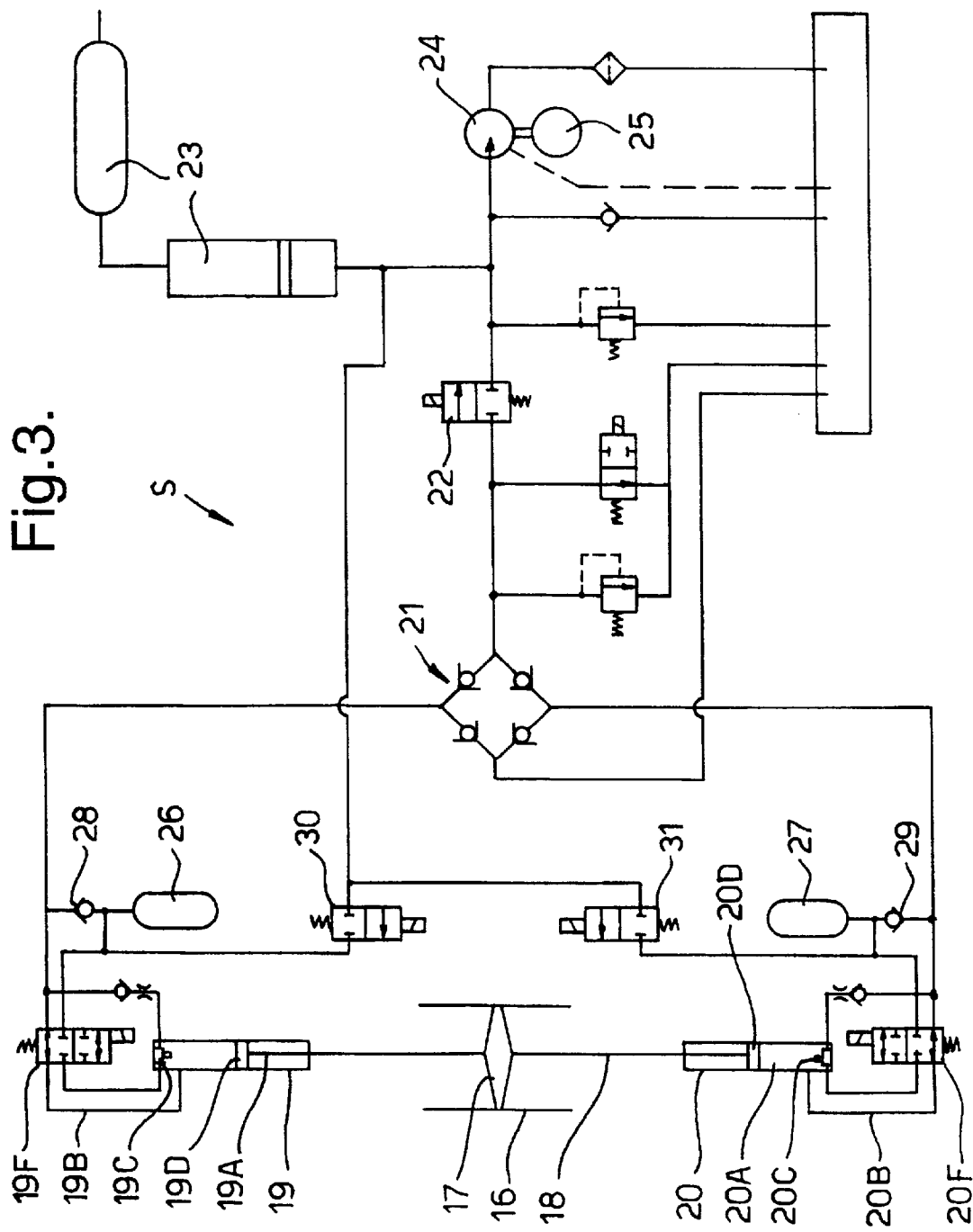
FIG. 3 is a diagram of a hydraulic system of the wave energy converter of FIGS. 1 and 2.

As will be readily appreciated, the means used to sense the extreme positions of the working piston and trigger the restoring device can take many forms, the triggering shown in FIGS. 2 and 3 being merely an illustrative example. Moreover, the auxiliary accumulators 26, 27 shown in FIG. 3 are not indispensable. Their function can be accomplished by the main accumulator 23.

What is claimed is:

1. A wave energy converter (10) comprising
a buoyant body (11),
an acceleration tube (14) dependent from and attached to the buoyant body (11) and having an upper end near the buoyant body and a lower end remote from the buoyant body, a section of the acceleration tube (14) intermediate the upper and lower ends of the acceleration tube defining a working cylinder (16),
openings in the acceleration tube (14) above and below the working cylinder (16) to allow in operation of the wave energy converter substantially unobstructed water flow between the working cylinder (16) and a body of water in which the acceleration tube (14) is immersed,
a working piston (17) which is reciprocable in the working cylinder (16),
relief passage means at the ends of the working cylinder (16) controlled by the working piston (17) to allow substantially unrestricted flow of water past the working piston in response to the working piston moving past a predetermined position at said end, and
an energy-absorbing device (19, 20, 24, 25) operatively connected with the working piston (17),
characterised by
a restoring device (19C, 20C, 26, 27) for applying to the working piston (17) an acceleration force directed towards the working cylinder (16) in response to the working piston (17) moving past said predetermined position.

2. A wave energy converter according to claim 1, characterised in that the restoring device comprises a pressure energy accumulator (26, 27) driven by the working piston (17).

3. A device according to claim 1, characterised by means (19E, 20E) controlled by the position of the working piston (17) for triggering the restoring device (19C, 20C, 26, 27).

* * * * *